United States Patent
Takemoto et al.

(10) Patent No.: US 8,300,177 B2
(45) Date of Patent: Oct. 30, 2012

(54) BACKLIGHT DEVICE, LIQUID CRYSTAL DISPLAY DEVICE AND ILLUMINATING DEVICE

(75) Inventors: Masashi Takemoto, Osaka (JP); Kiyohisa Ohta, Osaka (JP); Kenichi Ukai, Osaka (JP); Nobuyuki Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 433 days.

(21) Appl. No.: 12/596,789

(22) PCT Filed: Jun. 18, 2008

(86) PCT No.: PCT/JP2008/061114
§ 371 (c)(1),
(2), (4) Date: Oct. 20, 2009

(87) PCT Pub. No.: WO2009/001725
PCT Pub. Date: Dec. 31, 2008

(65) Prior Publication Data
US 2010/0053498 A1    Mar. 4, 2010

(30) Foreign Application Priority Data
Jun. 28, 2007   (JP) .................................. 2007-171279

(51) Int. Cl.
G02F 1/1335    (2006.01)
(52) U.S. Cl. ........................................................ 349/67
(58) Field of Classification Search .................... 349/62, 349/67
See application file for complete search history.

(56) References Cited

U.S. PATENT DOCUMENTS

| 7,554,625 B2 * | 6/2009 | Koganezawa ................... 349/61 |
| 2002/0196628 A1 | 12/2002 | Yoshida et al. |
| 2006/0203465 A1 | 9/2006 | Chang et al. |
| 2007/0030703 A1 | 2/2007 | Lee et al. |

FOREIGN PATENT DOCUMENTS

| CN | 1384393 A | 12/2002 |
| CN | 1844986 A | 10/2006 |
| EP | 1923364 A1 | 5/2008 |
| JP | 7-140331 A | 6/1995 |
| JP | 9-243810 A | 9/1997 |
| JP | 9-311208 A | 12/1997 |
| JP | 11-231144 A | 8/1999 |
| JP | 11-349615 A | 12/1999 |
| JP | 2001-42269 A | 2/2001 |
| JP | 2003-294948 A | 10/2003 |
| JP | 2004-325958 A | 11/2004 |
| JP | 2006-269485 A | 10/2006 |
| JP | 2007-45649 A | 2/2007 |
| JP | 2007-109915 A | 4/2007 |
| JP | 2007-142352 A | 6/2007 |
| JP | 2007-158211 A | 6/2007 |
| TW | 2006-32458 A | 9/2006 |

* cited by examiner

*Primary Examiner* — James Dudek
(74) *Attorney, Agent, or Firm* — Birch, Stewart, Kolasch & Birch, LLP

(57) ABSTRACT

A backlight device (10) includes: an LED package (12) including an LED chip (12A) and an Ag reflective layer (12B); and an optical member (for example, a prism sheet (16)) for adjusting light emitted from the LED package (12). The optical member (16) adjusts an amount of a halogen thus contained and the like so that emission of halogen is decreased to a degree in which no silver halide is generated on the Ag reflective layer (12B).

15 Claims, 5 Drawing Sheets

BACKLIGHT DEVICE, LIQUID CRYSTAL DISPLAY DEVICE AND ILLUMINATING DEVICE

TECHNICAL FIELD

The present invention relates to a backlight device of a liquid crystal display device and an illuminating device, which particularly use an LED (Light Emitting Diode) as a light source.

BACKGROUND ART

Fluorescent tubes such as CCFL have been conventionally used as a light source for liquid crystal display devices that are incorporated in devices such as TVs, in-board car navigation systems, and instrument panels. Recently, a white LED which has an extremely high brightness has been developed; replacement of the CCFL by the LED is now under consideration. This white LED, in order to achieve the high brightness, has a surface which reflects light emitted from an LED chip. In many cases, an Ag layer is formed on this surface by plating or vapor deposition of Ag that has an extremely high light reflectance of visible light (not less than 90%).

Regarding such an LED, Patent Literature 1 discloses a technique which attains a high refractive index in sealing resin of an LED chip, while suppressing a decrease in reflectance of a reflecting electrode caused by generation of a sulfide. Patent Literature 2 discloses a technique in which an optical sheet (for example a prism sheet) to be used in a liquid crystal display device or the like achieves both a high refractive index and elimination of a halogen, which elimination is for not adversely affecting the environment.

CITATION LIST

Patent Literature 1

Japanese Patent Application Publication, Tokukai, No. 2007-109915 A (Publication Date: Apr. 26, 2007)

Patent Literature 2

Japanese Patent Application Publication, Tokukaihei, No. 11-349615 A (Publication Date: Dec. 21, 1999)

SUMMARY OF INVENTION

Although the arrangement of Patent Literature 1 can suppress a decrease in reflectance when an LED chip is used solely, no durability is considered which is required in a case where the LED chip is used as, for example, a backlight source for a liquid crystal display device.

The inventors of the present invention found that, even if an LED chip shows sufficient durability when the LED chip is used solely, such LED chip may show remarkable deterioration in quality when the LED chip is incorporated into for example a liquid crystal module, that is to say, while it is being used as a product.

More specifically, a liquid crystal backlight device in which a white LED having the Ag reflective layer is provided as a light source was prepared for evaluation of a change in brightness of this backlight device. A result of this evaluation exhibited an extremely high initial brightness. However, when a reliability test was carried out, a remarkable decrease in brightness was observed, particularly in a high temperature environment. The larger the area of the Ag reflective layer, the more remarkable the decrease in brightness; when even an inside wall of a recess section in which the LED chip is mounted is coated with Ag, the brightness decreased to approximately 40% of the initial brightness after 1000 hours elapsed under a high temperature environment of not less than 85° C.

Analysis was made to the white LED (LED package) after the brightness decreased, and demonstrated that the Ag was blackened. An elementary analysis was made to the blackened Ag layer by use of an EDX (Energy Dispersive X-ray Fluorescence Spectrometer), and demonstrated that a Br signal was detected. Furthermore, a signal of AgBr2- was also detected by attempting a TOR-SIMS (time of flight-secondary ion mass spectrometry). This demonstrated that a compound that is not a sole element of Ag or Br, in other words, silver bromide (AgBr), is also contained in the blackened Ag layer. It was found that a generation source of the Br is an optical sheet (particularly a prism sheet: acrylic resin) which causes light emitted from the LED package to be converged in a predetermined direction. Br (a halogen excluding fluorine), as disclosed in Patent Literature 2, is contained in acrylic resin which is a constituent for increasing refraction index of the optical sheet and for improving a light-converging function.

From further analysis, it is assumed that a brightness decreasing mechanism of a liquid crystal backlight occurs through the following procedures:

(1) Br gas is generated from an optical sheet under a high temperature environment (for example, not less than 85° C.)

(2) The Br gas adheres to the Ag layer of the LED package that emits visible light. Usually, the Ag layer is sealed with resin together with the LED chip. However, due to long-term use, there are (i) cases where the Br gas permeates through the sealing resin and reaches the Ag surface, and (ii) cases where the Ag layer gradually exfoliates in an interface between the sealing resin and the inside walls of a recess section, the Br gas gets through an exfoliated portion and reaches the Ag surface. This may cause the generation of silver bromide (AgBr). The silver bromide (AgBr) thus generated absorbs light emitted from the LED chip and a fluorescent substance. As a result, reflectance of the Ag reflecting surface decreases, thereby decreasing the brightness of the liquid crystal backlight.

(3) The silver bromide is blackened by the light emitted from the LED chip and the fluorescent substance. This causes an increase in absorption of light emitted from the LED package, thereby causing a further decrease in reflectance of the Ag reflecting surface. As a result, the brightness of the liquid crystal backlight device decreases even more.

The present invention is accomplished in view of the problems, and its object is to attain a backlight device and a illuminating device (i) which include as their constituents a light source (for example, LED) and an optical member which have a light reflecting surface containing Ag in its raw material, and (ii) which can suppress a decrease in brightness in a high temperature environment and/or due to long-term driving while improving overall brightness.

In order to attain the object, a backlight device in accordance with the present invention includes: an LED package including an LED chip and a light reflecting surface, the light reflecting surface containing Ag as its raw material; and an optical member for adjusting light emitted from the LED package, release of a halogen from the optical member being small to such an extent that no silver halide is generated on the light reflecting surface.

According to the arrangement, by suppressing release of a halogen from the optical member, it is possible to prevent the generation of silver halide due to bonding of silver and the halogen on the light reflecting surface. If such silver halide is generated, the silver halide blackens due to further light emission from the LED, thereby causing a remarkable decrease in reflection efficiency. In contrast, with the arrangement that prevents the generation of silver halide, it is possible to prevent such a decrease in reflection efficiency.

DESCRIPTION OF EMBODIMENTS

One embodiment of the present invention is described below with reference to FIGS. 1 to 7. First Embodiment describes an example in which the present invention is applied to a backlight device of a liquid crystal display device. First described is a schematic arrangement of a backlight device, with reference to FIG. 1.

Figure 1:
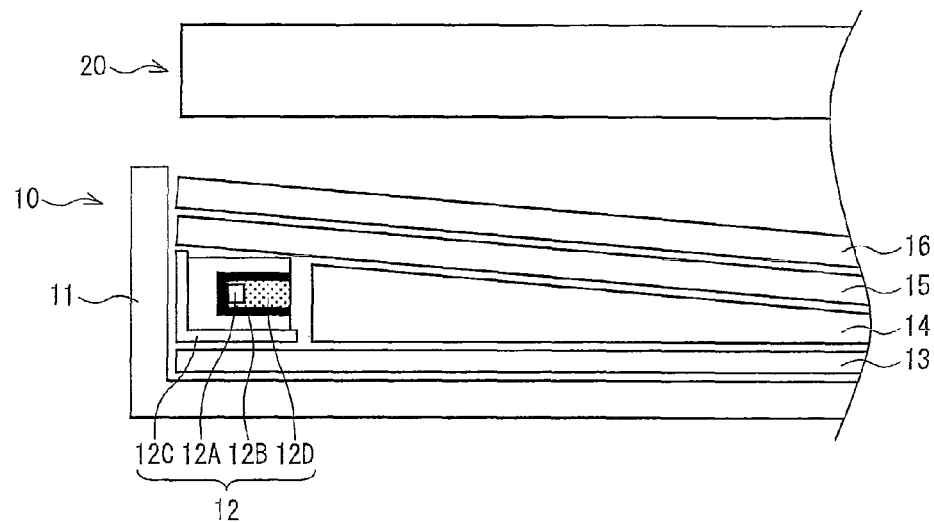
FIG. 1 illustrates an embodiment of the present invention, and is a cross-sectional view illustrating an essential part of a backlight device.

A backlight device 10 illustrated in FIG. 1 includes a backlight case 11 and LED light sources (LED package) 12. The LED light sources 12 are mounted along one side of the backlight case 11, and each of the LED light sources 12 is mounted with an LED chip 12A. Inside the backlight case 11, a reflection sheet 13, a light guide plate 14, a diffusion sheet 14, and an optical sheet (e.g., prism sheet) 16 are stacked in this order. Moreover, in the liquid crystal display device, a liquid crystal panel 20 is provided on a front side (observer side) of the backlight device 10.

The LED packages 12 are mounted on a printed circuit board 12C made of, for example, an FPC (Flexible Printed Circuit), which each of the LED packages 12 is provided at predetermined intervals as a plurality of point sources. Each of the LED light sources 12 has an Ag reflective layer 12B as a reflecting surface for improving light use efficiency. The Ag reflective layer 12B is provided by silver plating a surface of an electrode for supplying power to the LED chip 12A or by silver plating an inside wall surface of a metal package in which the LED chip 12A is provided. The LED chip 12A and the Ag reflective layer 12B are sealed with sealing resin 12D. The sealing resin 12D is usually made of epoxy resin or silicone resin. Note however that the material of the sealing resin 12D is not particularly limited in the present invention. It is more preferable, however, to use silicone resin which has good resin deterioration property against short-wavelength light, in case of an LED package in which an LED chip whose wavelength of luminescence peak is 450 nm.

A light guide plate 14 is means for guiding light emitted from the LED light source 12 toward a back side of the liquid crystal panel 20. The reflection sheet 13 is means for reflecting light emitted toward a back side of the light guide plate 14 (opposite side of liquid crystal panel) so that the light is reflected back toward the liquid crystal panel side. The reflection sheet 13, in order to improve its reflection efficiency, can have a reflecting surface which is coated with an Ag layer.

Figure 7:
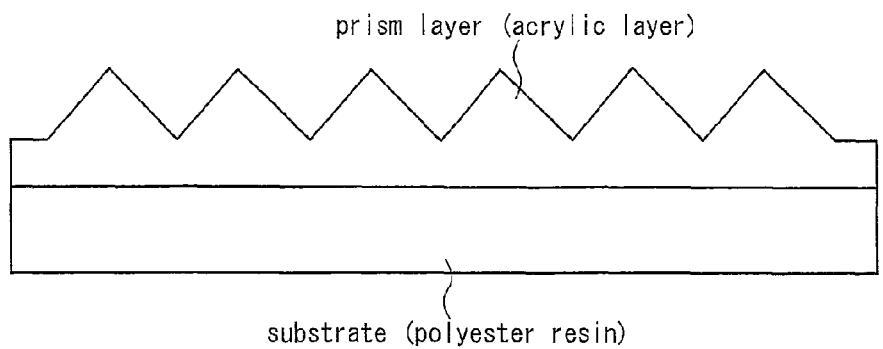
FIG. 7 is a cross-sectional view illustrating an arrangement example of a prism sheet to be used in a backlight device.

The diffusion sheet 14 is means for diffusing light guided through the light guide plate 14 so as to improve in-plane evenness of light that is irradiated toward the liquid crystal panel 20. The optical sheet 16 is means for converging light that is irradiated toward the liquid crystal panel 20 so as to improve front brightness. The optical sheet 16 is a prism sheet in which a prism layer made of acrylic resin is stacked on a polyester base material as illustrated in FIG. 7 for example; a good light-converging function is attained by improving the refractive index of the prism layer.

The objective of a backlight device of the present invention is to suppress a decrease in reflectance caused by the fact that the Ag reflective layer 12B deteriorates with time, particularly caused by the fact that silver halide is generated due to bonding of Ag and a halogen such as Br. Hence, the backlight device is arranged so as to suppress release of a halogen from an optical member included in the backlight device.

Conventionally, the optical member that is assumed to release the most halogen is a prism sheet. The optical sheet (here, the prism sheet) 16 in the backlight device 10 in accordance with the present embodiment includes no halogen.

Figure 2:
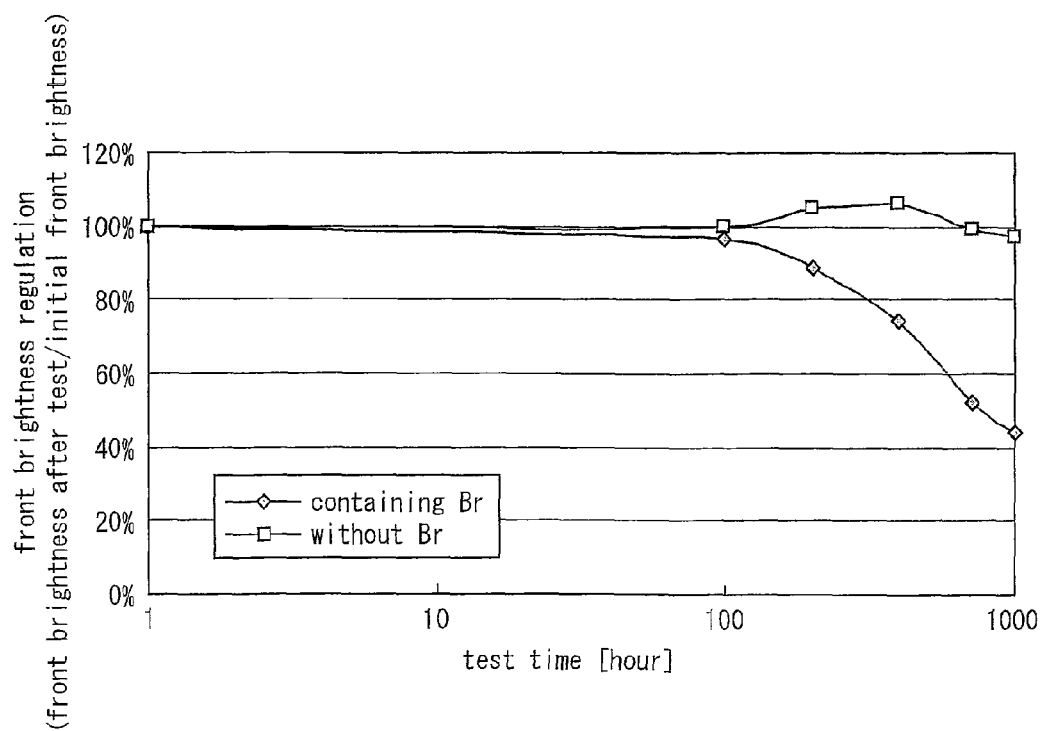
FIG. 2 is a graph showing a relationship between a light-emitting time and a brightness fluctuation rate.

A decrease in brightness due to change with time was measured with respect to a backlight device with use of an optical sheet that contains no halogen (see FIG. 2). An initial front brightness measured at 25° C. was 303 (cd/m$^2$). A high-temperature electrification test (85° C./60 mA) was carried out with respect to the backlight device. As a result, a front brightness regulation (=front brightness measured at 25° C. after 1000-hour testing for a predetermined time period/initial front brightness measured at 25° C. before conducting the test) was 97.4%. On the other hand, when around 25000 ppm of Br was included in the prism layer for comparison (the initial properties are the same), the front brightness regulation was 43.7%. The LED package was analyzed. It was confirmed by visual inspection that the Ag layer was blackened. It was also confirmed that silver bromide was present as a result of TOF-SIMS measurement.

That is to say, according to the backlight device 10 of the present embodiment, it was possible to prevent the blackening of the Ag reflective layer by including no halogen in the optical sheet 16, thereby ultimately suppressing a remarkable decrease in brightness of the backlight device.

In the above example, the decrease in brightness of the backlight device is suppressed by including no halogen (0 contained amount) in the prism sheet. Note however that it is also basically necessary to suppress release of a halogen from an optical member other than the prism sheet. Particularly, a halogen such as Br is frequently used for improving refractive index of a light-transmitting member. There also is a possibility that a halogen is included in light-transmitting members such as the light guide plate and the diffusion sheet. Therefore, the present invention requires suppressing release of a halogen for all members such as optical members used in the backlight device, an adhesive sheet, and an adhesive applied between members.

The example is based on the premise that the prism sheet includes no halogen. This is just one of the most easy and secure methods for preventing blackening of the Ag reflective layer so as to suppress the decrease in brightness of the backlight device. Basically, the decrease in brightness is preventable, provided that (i) halogen release amount from the optical member is extremely small and (ii) no silver halide is generated on the Ag surface of the LED package.

For example, Br (group) can be included in a molecular structure of an acrylic resin that is a material for the prism sheet so that no free Br that is not incorporated in the molecular structure is contained. The bond of Br incorporated in the molecular structure is strong to some extent, and so the bond cannot be easily broken by heat. As a result, it is difficult for Br to be released. With the arrangement, it is possible to realize an easy improvement of refractive index by including Br in the prism sheet. This allows (i) enhancement of a light-converging effect and (ii) suppression of halogen release.

Alternatively, it is possible to provide an arrangement in which an added amount of Br is adjusted to such an extent that (i) few Br gas is released although the free Br is included and (ii) no silver bromide is formed on the Ag surface of the LED package.

Alternatively, a halogen contained in the prism sheet can be substituted by another halogen (excluding fluorine) such as I (iodine) or Cl (chloride), instead of Br. A relationship between an atomic refraction index R and a refraction index n is represented by the following general formula (I):

$$n^2=(1+2R/V)/(1-R/V) \quad (1)$$

where V denotes a volume per mol. When Br is replaced with a halogen that has a high atomic refractive index (e.g., I), the effect of improving the refractive index with respect to the halogen-contained amount, and the converging effect of the prism sheet improves, thereby allowing an improvement in brightness of the backlight device.

Furthermore, in the present invention, halogen in the optical member such as the prism sheet preferably includes a bromide of not more than 800 ppm and/or chlorine of not more than 800 ppm so that the total amount of bromide and chlorine is not more than 1000 ppm. It is more preferable that the total amount of the bromide and the chlorine is not more than 300 ppm. The amount of halogen can be measured by, for example, an ion chromatograph method.

In the aforementioned example, the decrease in brightness of the backlight device is suppressed by preventing or suppressing the release of halogen from an optical member so as to prevent generation of silver halide on the Ag reflection surface. The prevention of generating silver halide is not necessarily permanently in effect under any condition. The prevention of generating silver halide denotes a prevention of generation of silver halide at least within a guaranteed use time and a guaranteed use temperature range of the backlight device.

Figure 3:
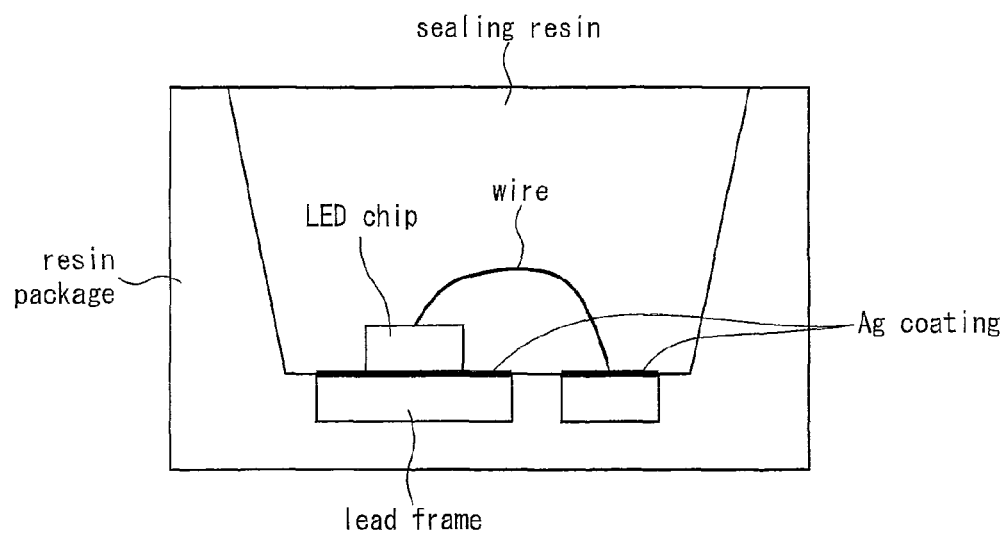
FIG. 3 is a cross-sectional view illustrating an arrangement example of a LED package to be used in a backlight device.
Figure 4:
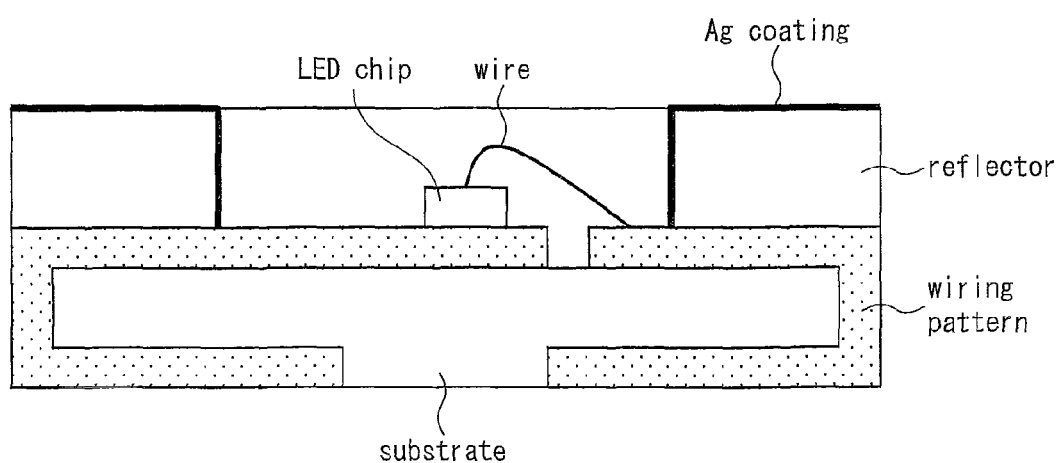
FIG. 4 is a cross-sectional view illustrating an arrangement example of a LED package to be used in a backlight device.

The following description explains examples of an LED package in which the present invention is suitably applicable, with reference to FIGS. 1, 3, and 4.

An LED package illustrated in FIG. 1 (i.e., LED light source 12) has a metal part adhered to an insulating substrate. The metal part is opened at an opposite side to its surface connected with the substrate, so as to have a recessed part capable of storing an LED chip. An inside wall of the recess-shape is plated with Ag. A mounting surface made of metal and a wire bonding section are provided on the insulating substrate via a spaced section, and a resin is filled in the spaced section.

The surface on which the LED chip is mounted and the wire bonding section are also plated with Ag. On the surface on which the LED chip is mounted, an upper electrode of the LED chip and the wire bonding section are connected via a wire. The wire bonding section and the mounted surface are connected to an anode external electrode section and a cathode external electrode section on a back side of the substrate, respectively, via a wiring layer in the insulating substrate.

A resin that contains a fluorescent substance seals the recess-shaped part, so as to cover the LED chip. Silicone resin is used as the sealing resin, the silicone resin having a good light-resistance which causes the silicone resin to have a less change into yellow when the silicone resin receives a blue light in a range of 440 nm to 460 nm from the LED chip.

The surface plated with Ag reflects (i) the blue light emitted from the LED chip having a peak wavelength in a range of 440 nm to 460 nm and (ii) fluorescent light emitted from the fluorescent substance that is excited by the blue light. The blue light and the fluorescent light are emitted from the opening of the metal part, and are then incident on a light guide plate of the liquid crystal backlight device as white light.

Next, an LED package illustrated in FIG. 3 is an example where an LED chip is mounted on a lead frame and white resin which reflects light is provided so as to surround the LED chip.

The LED package illustrated in FIG. 3 has a smaller Ag area than the LED package illustrated in FIG. 1. A backlight device that incorporates a prism sheet containing 255000 ppm of Br was prepared to carry out the aforementioned high-temperature electrification test. A result of the test exhibited a less influence of front brightness regulation since the Ag area is smaller in the LED package illustrated in FIG. 3 than in the LED package illustrated in FIG. 1. However, the influence is still not 0. Hence, the measure of the present invention is required, in consideration of the influence of a long-term use.

An LED package illustrated in FIG. 4 is an example where there are many Ag electrodes. Specifically, Ag coating is provided inside of a reflector and a surface of the opening. According to the example, light reflectance is high even on the opening surface of the reflector because of the Ag coating. Further, light that is reflected back from the diffusion sheet is again reflected, thereby allowing an improvement in light use efficiency. This ultimately allows a further improvement in brightness.

In the arrangement of FIG. 4, spaced wiring patterns are provided on a resin substrate (hereinafter referred to as substrate), and a reflector made of insulating resin that has a through hole is attached to the substrate surface on which the spaced wiring patterns are provided. An LED chip is mounted on one of the wiring patterns at a part thereof that is exposed by having the through hole, such that the LED chip and the wiring pattern are electrically connected to each other via a lower electrode of the LED chip. An upper electrode of the LED chip is electrically connected to the other of the wiring patterns via a wire. The through hole part is sealed with a resin that includes a fluorescent substance such that the resin covers the LED chip and the wire.

In the arrangement of FIG. 4, the light use efficiency is improved by the Ag coating provided on the opening surface of the reflector. However, this Ag coating layer is not sealed with the sealing resin, and is therefore deteriorated more easily than the Ag coating layer inside the reflector. Therefore, the present invention that suppresses release of a halogen from the optical member is suitably applicable.

In the aforementioned explanation, a backlight device in which an LED is used as the light source is given as an example. However, the present invention is applicable to a backlight device which includes (i) a light source other than an LED and (ii) a member coated with Ag.

Figure 5:
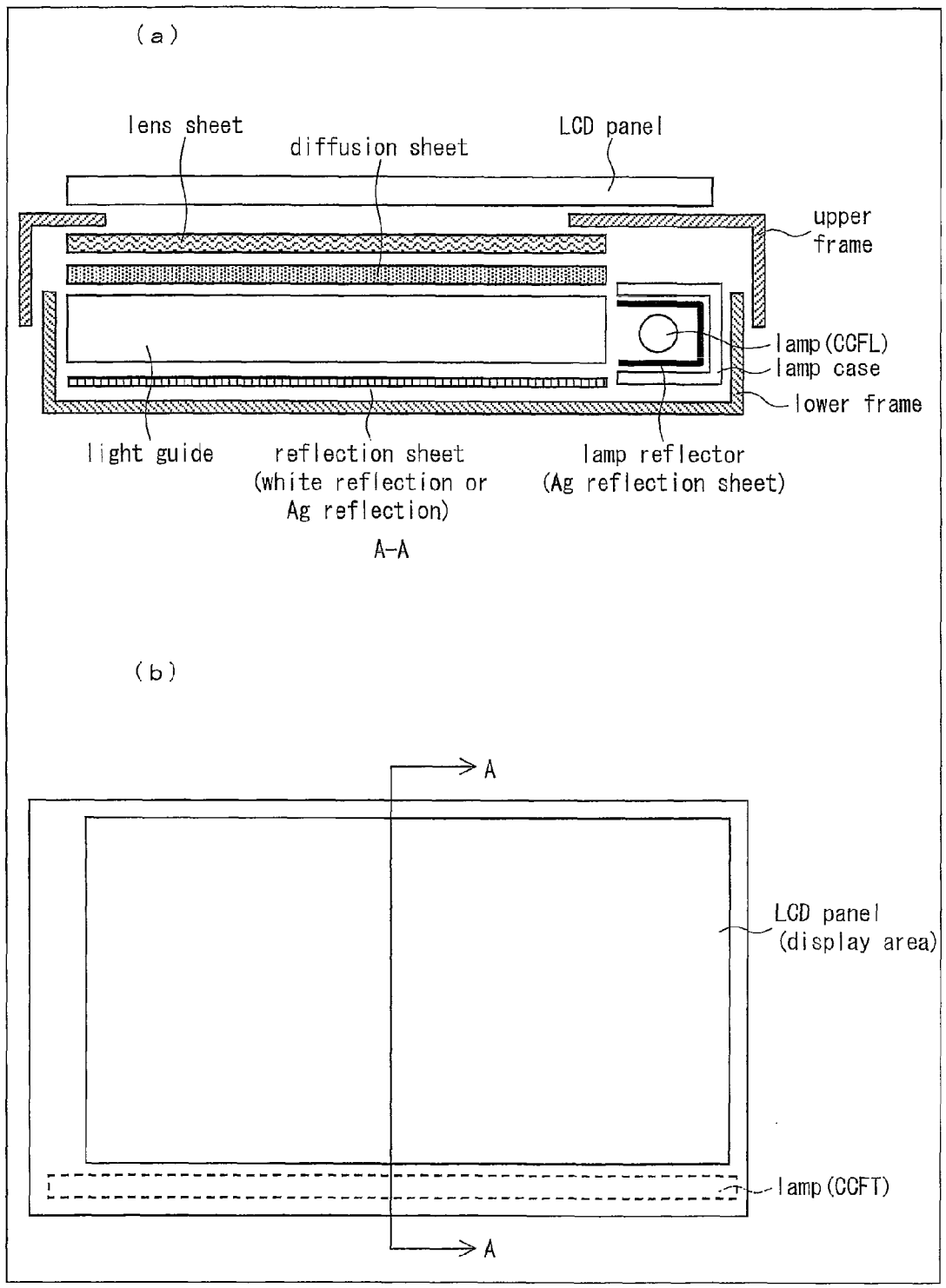
FIG. 5 illustrates an arrangement example of a backlight device with use of a CCFL as a light source; (a) is a cross-sectional view of the backlight device arrangement taken on line A-A, and (b) is a plan view thereof.

For example, a backlight device illustrated in FIG. 5 includes a light guide plate on a reflection film, and a light source, constituted by a CCFL (Cold Cathode Fluorescent Lamp), which is provided at an edge in a lateral direction of the light guide plate. A diffusion plate is provided on the light guide plate. The diffusion plate evenly diffuses light received from the light source within the light guide plate surface while directing upward the light thus diffused. A lens sheet for converging light upward is provided on the diffusing plate. A lamp reflector is provided around the light source, so that all the light emitted from the light source is directed toward the light guide plate. Inside wall of the lamp reflector and the reflection film are coated with Ag, having high light reflectance, for reflecting light.

Even with such an arrangement, there is the possibility that Ag provided on the inside wall of the lamp reflector and the reflection film blackens if a halogen (particularly Br) is included in the lens sheet. Therefore, it is necessary to provide an arrangement for preventing or suppressing release of a halogen from the lens sheet, as similar to the backlight which uses the aforementioned LED light source.

Moreover, the arrangement of FIG. 5 can employ organic EL or inorganic EL instead of the CCFL as the light source.

Figure 6:
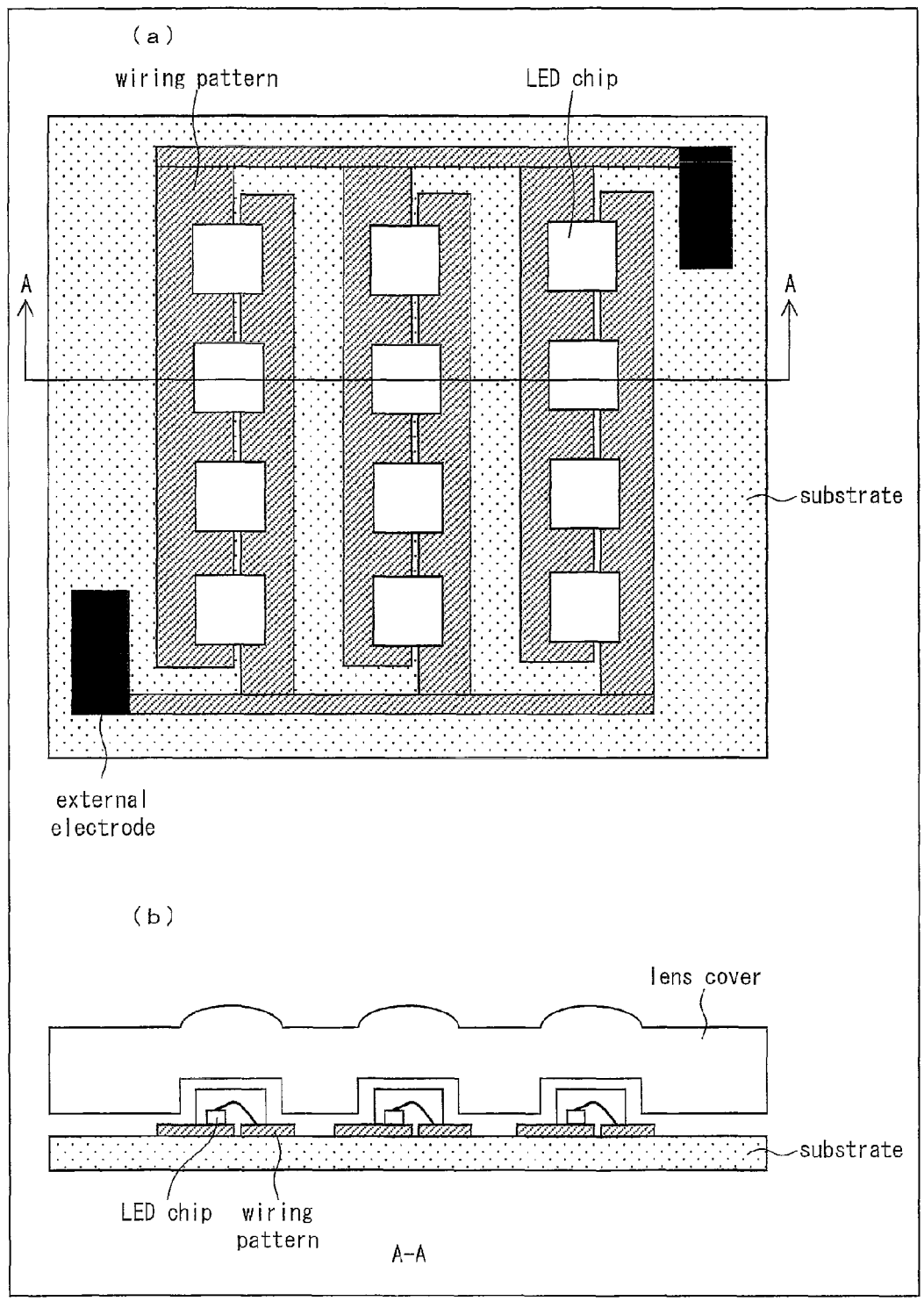
FIG. 6 illustrates an arrangement example of a planar light source type backlight device that incorporates an LED as the light source; (a) is a plan view of the backlight device, and (b) is a cross-sectional view thereof taken on line A-A.

FIG. 6 illustrates an arrangement example of a planar light source type backlight device. In the arrangement of FIG. 6, anode and cathode wiring patterns are alternately juxtaposed, in a column manner, on an intense heat releasing insulating substrate. One end of the anode wiring pattern is connected to an anode external electrode section, and one end of the cathode wiring pattern is connected to an cathode external electrode section. Each of LED chips is mounted on the cathode wiring pattern so as to be electrically connected to the cathode wiring pattern via its lower electrode. An upper electrode of the each of the LED chips and the cathode wiring pattern are connected with each other via a wire. Each of the LED chips and the wire are sealed with fluorescent-substance-containing resin. This causes individual white LEDs to be formed.

In the aforementioned example, each of the anode and cathode wiring patterns uses Ag for improving reflectance of white light. A lens cover unit is further provided such that a lens is provided directly above each of the white LEDs. This allows light from the individual white LEDs to be directed and converged upward.

Even with such an arrangement, the Ag included in each of the anode and cathode wiring patterns may blacken if a halogen (particularly Br) is included in the lens cover unit. Therefore, it is necessary to provide an arrangement for preventing or suppressing release of a halogen from the lens cover unit, as similar to the backlight device which incorporates the aforementioned LED light source.

Figure 8:
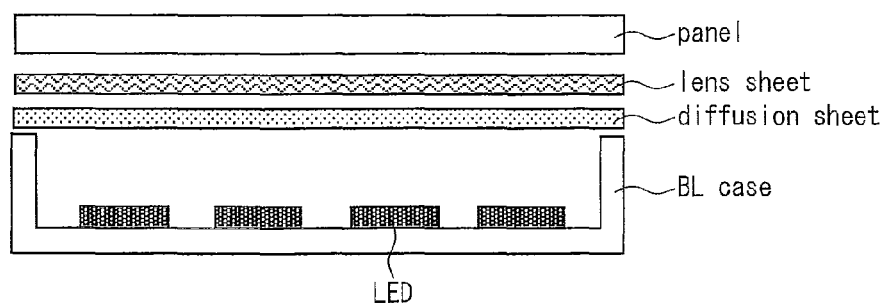
FIG. 8 is a cross-sectional view illustrating an arrangement example of a liquid crystal TV which has a direct-backlight device as its light source.

FIG. 8 illustrates an Example of a liquid crystal TV in which a direct backlight device is incorporated as its light source.

In this Example, a direct backlight device includes a BL case in which a plurality of LED packages which emit light upward (in an upper surface direction) is stored, and a diffusion sheet (diffusion plate), a lens sheet, and a panel are stacked in this order above the backlight device. Inside wall of the BL case has an Ag reflection surface. The inside wall reflects light from the plurality of LED packages and reflected light from the diffusion sheet. The plurality of LED packages can be ones used as the light source of the backlight device of FIG. 1, which are provided in a top-view arrangement. Alternatively, the plurality of LED packages can be made up of a plurality of LED packages each illustrated in FIG. 4. How the diffusion sheet, the lens sheet, and the panel operate are the same as the Example of FIG. 5. Even in the alternative arrangements, it is necessary that the lens sheet has an arrangement which can prevent or suppress release of a halogen so that the Ag reflection surface of the inside wall of the BL case is prevented from blackening.

The present invention is not limited to be applied to the aforementioned backlight devices, but is also applicable to other illuminating devices which include a light source, an optical member, and a member coated with Ag. Note that the optical member here basically intends a transmissive member. By preventing or suppressing the release of a halogen from the optical member, it is possible to prevent blackening of the Ag coating layer, thereby preventing or suppressing a decrease in reflectance.

As described above, a backlight in accordance with the present invention includes: an LED package including an LED chip and a light reflecting surface, the light reflecting surface containing Ag as its raw material; and an optical member for adjusting light emitted from the LED package, release of a halogen from the optical member being small to such an extent that no silver halide is generated on the light reflecting surface.

According to the arrangement, by suppressing release of a halogen from the optical member, it is possible to prevent the generation of silver halide due to bonding of silver and the halogen on the light reflecting surface. If such silver halide is generated, the silver halide blackens due to further light emission from the LED, thereby causing a remarkable decrease in reflection efficiency. In contrast, with the arrangement that prevents the generation of silver halide, it is possible to prevent such a decrease in reflection efficiency.

Moreover, the backlight device may be arranged such that the optical member is made of resin, and does not contain a halogen, except for a halogen incorporated in a molecular chain of the resin which constitutes the optional member.

According to the arrangement, the halogen contained in the optical member is incorporated in a molecular chain of the resin. Thus, halogen release is small even under poor conditions such as under a high temperature environment. Thus, it is possible to prevent generation of silver halide caused by bonding of silver and a halogen on a light reflecting surface.

The backlight device may be arranged such that the halogen is bromine (Br).

Moreover, the backlight device may be arranged such that the optical member is a member which receives, from its back side, light emitted from the LED package, and converges and directs the light towards its front side.

Moreover, the backlight device may be arranged such that, the optical member has a prism layer made of acrylic resin stacked on a polyester base material.

Moreover, the backlight device may be arranged such that the light reflecting surface is provided on a surface on which the LED chip is mounted.

According to the arrangement, a light reflecting surface is attained by for example having a LED chip electrode be a silver electrode.

Moreover, the backlight device may be arranged such that the LED chip is mounted in a recessed part of the LED package, and the light reflecting surface is provided to a whole of a wall surface of the recessed part, of the LED package.

According to the arrangement, use efficiency of light is improved by increasing an area of which a light reflecting surface is formed. Moreover, application of the present invention is suitable for a backlight device having a large light reflecting surface area, since the decrease in brightness when the light reflecting surface blackens is remarkable.

Moreover, the backlight device may be arranged such that the light reflecting surface is sealed with a sealing resin. Further, the backlight device may be arranged such that the sealing resin is made of silicone resin.

The invention claimed is:

1. A backlight device comprising:
   an LED package including an LED chip and a light reflecting surface, the light reflecting surface containing Ag as its raw material; and
   an optical member for adjusting light emitted from the LED package,
   release of a halogen from the optical member being small to such an extent that no silver halide is generated on the light reflecting surface, wherein:
   the optical member is made of resin, and does not contain a halogen, except for a halogen incorporated in a molecular chain of the resin which constitutes the optical member.

2. The backlight device according to claim 1, wherein the halogen is bromine (Br).

3. The backlight device according to claim 1, wherein the optical member is a member which receives, from its back side, light emitted from the LED package, and converges and directs the light toward its front side.

4. The backlight device according to claim 3, wherein the optical member has a prism layer made of acrylic resin stacked on a polyester base material.

5. The backlight device according to claim 1, wherein the light reflecting surface is provided on a surface on which the LED chip is mounted.

6. The backlight device according to claim 1, wherein:
   the LED chip is mounted in a recessed part of the LED package, and
   the light reflecting surface is provided to a whole of a wall surface of the recessed part of the LED package.

7. The backlight device according to claim 1, wherein the light reflecting surface is formed around an opening of the LED package.

8. The backlight device according to claim 5, wherein the light reflecting surface is sealed with a sealing resin.

9. The backlight device according to claim 8, wherein the sealing resin is a silicone resin.

10. A backlight device comprising:
    an LED package including an LED chip and a light reflecting surface, the light reflecting surface containing Ag as its raw material; and
    an optical member for adjusting light emitted from the LED package,
    release of a halogen from the optical member being small to such an extent that no silver halide is generated on the light reflecting surface, wherein
    a halogen in the optical member includes bromine of not more than 800 ppm and/or chlorine of not more than 800 ppm so that the total amount of bromine and chlorine is not more than 1000 ppm.

11. A liquid crystal display device comprising a backlight device recited in claim 1.

12. The liquid crystal display device according to claim 1, which is mounted to an in-board car navigation, an instrumental panel, or a TV apparatus.

13. An illuminating device comprising:
    a light source;
    a member having a light reflecting surface which contains Ag as its raw material; and
    an optical member for adjusting light emitted from the light source,
    release of a halogen from the optical member being small to such an extent that no silver halide is generated on the light reflecting surface, wherein:
    the optical member is made of resin, and does not contain a halogen, except for a halogen incorporated in a molecular chain of the resin which constitutes the optical member.

14. The backlight device according to claim 6, wherein the light reflecting surface is sealed with a sealing resin.

15. The backlight device according to claim 14, wherein the sealing resin is a silicone resin.

* * * * *